United States Patent
Kashyap et al.

(10) Patent No.: US 11,012,377 B2
(45) Date of Patent: *May 18, 2021

(54) EFFICIENT NETWORK LINK STATUS HANDLING

(71) Applicant: Cisco Technology, Inc., San Jose, CA (US)

(72) Inventors: Dhiraj Kashyap, Bangalore (IN); Charu Jain, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,579

(22) Filed: Jun. 10, 2020

(65) Prior Publication Data
US 2020/0304428 A1 Sep. 24, 2020

Related U.S. Application Data

(63) Continuation of application No. 16/186,680, filed on Nov. 12, 2018, now Pat. No. 10,742,569.

(51) Int. Cl.
*H04L 12/935* (2013.01)
*H04L 12/751* (2013.01)
*H04L 12/931* (2013.01)
*H04L 12/741* (2013.01)

(52) U.S. Cl.
CPC .......... *H04L 49/30* (2013.01); *H04L 45/026* (2013.01); *H04L 45/745* (2013.01); *H04L 49/70* (2013.01)

(58) Field of Classification Search
CPC ............... H04L 49/30; H04L 45/026

USPC ......................................... 370/419
See application file for complete search history.

(56) References Cited

U.S. PATENT DOCUMENTS

| | | | |
|---|---|---|---|
| 6,278,708 B1 | 8/2001 | Von Hammerstein et al. | |
| 8,627,313 B2 | 1/2014 | Edwards et al. | |
| 9,942,144 B1 | 4/2018 | Ramalingam et al. | |
| 10,742,569 B2 * | 8/2020 | Kashyap | H04L 45/745 |
| 2004/0085901 A1 | 5/2004 | Hooper et al. | |
| 2007/0041374 A1 | 2/2007 | Kapoor et al. | |
| 2012/0163395 A1 | 6/2012 | Shukla et al. | |
| 2013/0182668 A1 | 7/2013 | Xu et al. | |
| 2014/0185615 A1 | 7/2014 | Ayoub et al. | |
| 2014/0185627 A1 * | 7/2014 | Ditya | H04L 49/356 |
| | | | 370/409 |
| 2014/0313932 A1 | 10/2014 | Saltsidis | |
| 2016/0036702 A1 | 2/2016 | Yang | |

(Continued)

OTHER PUBLICATIONS

White Paper, "Fibre Channel over Ethernet Initialization Protocol", C11-560403-00, www.cisco.com, Sep. 2009, 12 pages.

*Primary Examiner* — Peter G Solinsky
(74) *Attorney, Agent, or Firm* — Edell, Shapiro & Finnan, LLC (57) ABSTRACT

A multi-port status message maintains network connections between virtual ports of two network elements. The network elements negotiate the network connections between first virtual ports on a first network element and corresponding second virtual ports on a second network element. The second network element receives a single multi-port status message listing the first virtual ports that are actively connected to the corresponding second virtual ports. The second network element updates the status of the corresponding second virtual ports to maintain the network connections.

20 Claims, 5 Drawing Sheets

(56) References Cited

U.S. PATENT DOCUMENTS

2016/0350151 A1 12/2016 Zou et al.
2018/0219777 A1 8/2018 He et al.

* cited by examiner

EFFICIENT NETWORK LINK STATUS HANDLING

CROSS REFERENCE TO RELATED APPLICATIONS

This application is a continuation of U.S. patent application Ser. No. 16/186,680, filed Nov. 12, 2018, entitled "Efficient Network Link Status Handling," the entire contents of which are hereby incorporated by reference.

TECHNICAL FIELD

The present disclosure relates to maintaining virtual links in computer networks.

BACKGROUND

In some networking environments, the operational status of a network connection between ports of two network elements is monitored and maintained via periodically transmitted status messages. At predetermined intervals, one or both network elements transmits a status message from one port to the corresponding port of the network element on the other end of the network connection. Upon receiving the status message, the network element continues to maintain the corresponding port. Failure to receive a status message for a particular network connection using a particular port signals the network element that the port may no longer be required, and the network element may direct resources to other ports.

Virtual networking allows configurable network elements to define virtual ports according to the current needs of the networking environment. As the number and configuration of network connections within the network environment changes, each network element allocates resources to maintaining virtual ports that support the current configuration. Two network elements may support a variable number of network connections between the two physical network devices through a variable number of virtual ports.

DESCRIPTION OF EXAMPLE EMBODIMENTS

Overview

Presented herein are techniques for maintaining a plurality of network connections between virtual ports of two network elements. The techniques include negotiating the plurality of network connections between a plurality of first virtual ports on a first network element and a corresponding plurality of second virtual ports on a second network element. The first network element generates a multi-port status message listing the plurality of first virtual ports that are actively connected to the corresponding plurality of second virtual ports. The first network element sends the multi-port status message to the second network element to maintain the plurality of network connections.

DETAILED DESCRIPTION

Fiber Channel over Ethernet (FCoE) is a protocol that enables the transport of Fiber Channel (FC) payloads over a lossless Ethernet medium. FCoE Initialization Protocol (FIP) is an FCoE protocol responsible for establishing and maintaining Fiber Channel virtual links between pairs of FCoE devices, such as End Node (ENodes) and FCoE Forwarders (FCFs). During the virtual link establishment phase, FIP first discovers FCoE Virtual Local Area Networks (VLANs) and remote virtual FC interfaces. The FIP devices then perform virtual link initialization functions (e.g., fabric login (FLOGI) and fabric discovery (FDISC), or Exchange Link Parameters (ELP)) similar to native Fiber Channel equivalents. After the virtual link is established, Fiber Channel payloads may be exchanged on the virtual link, and FIP remains in the background to perform virtual link maintenance functions. For instance, FIP continuously verifies reachability between two virtual FC interfaces on the Ethernet network, and offers primitives to delete the virtual link in response to administrative actions.

A FIP network system typically establishes virtual FC links between Virtual Network (VN) ports on an ENode and Virtual Fabric (VF) ports on an FCF device, as well as between pairs of Virtual Edge (VE) ports on two FCF devices, since these are two network links supported by native Fiber Channel fabrics. Fiber Channel is a point-to-point topology where fault detection is typically identified through link failure. However, node failure in Ethernet (i.e., a broadcast medium) is typically identified through a keep-alive mechanism. Additionally, VE ports and VF ports may be connected by more than one physical link. For this reasons, the FIP protocol prescribes exchanging Fabric Keep-alive Advertisement (FKA) messages between different entities (e.g., FCF and ENode) in an FCoE network. For instance, the ENode may send periodic ENode FIP FKA messages to the FCF with the ENode Media Access Control (MAC) address as an identifier. If the FCF does not receive the ENode FKA before the FKA timer expires on the FCF, then the FCF determines that the virtual link to the ENode is down and may terminate the virtual link to the ENode.

Typically, each ENode maintains a timer for each Virtual Storage Area Network (VSAN). Upon expiry of the timer (e.g., after eight seconds), an FKA message is sent from the ENode to the FCF to maintain the status of the virtual link. If multiple VSANs are configured on the ENode, then each VSAN will have an associated timer, and the ENode will send an FKA message when each timer expires. Multiple FCF devices may be deployed in a large scale setup, and each FCF device may be configured with a large number of VSANs. In this configuration, processing all of the FKA messages in this protocol may consume significant processing resources, in addition to other FIP messages (e.g., Discovery, Solicitation, etc.). The additional processing may result in a delay in sending/receiving FKA messages, which may cause a keep-alive "miss" and a declaration that the virtual link is down. As the scale of the FCoE network increases (i.e., with the addition of more ENodes and FCF devices with more VSANs), ENodes may need to send an increasing number of FKA messages to maintain links for the increasing number of VSANs.

Figure 1:
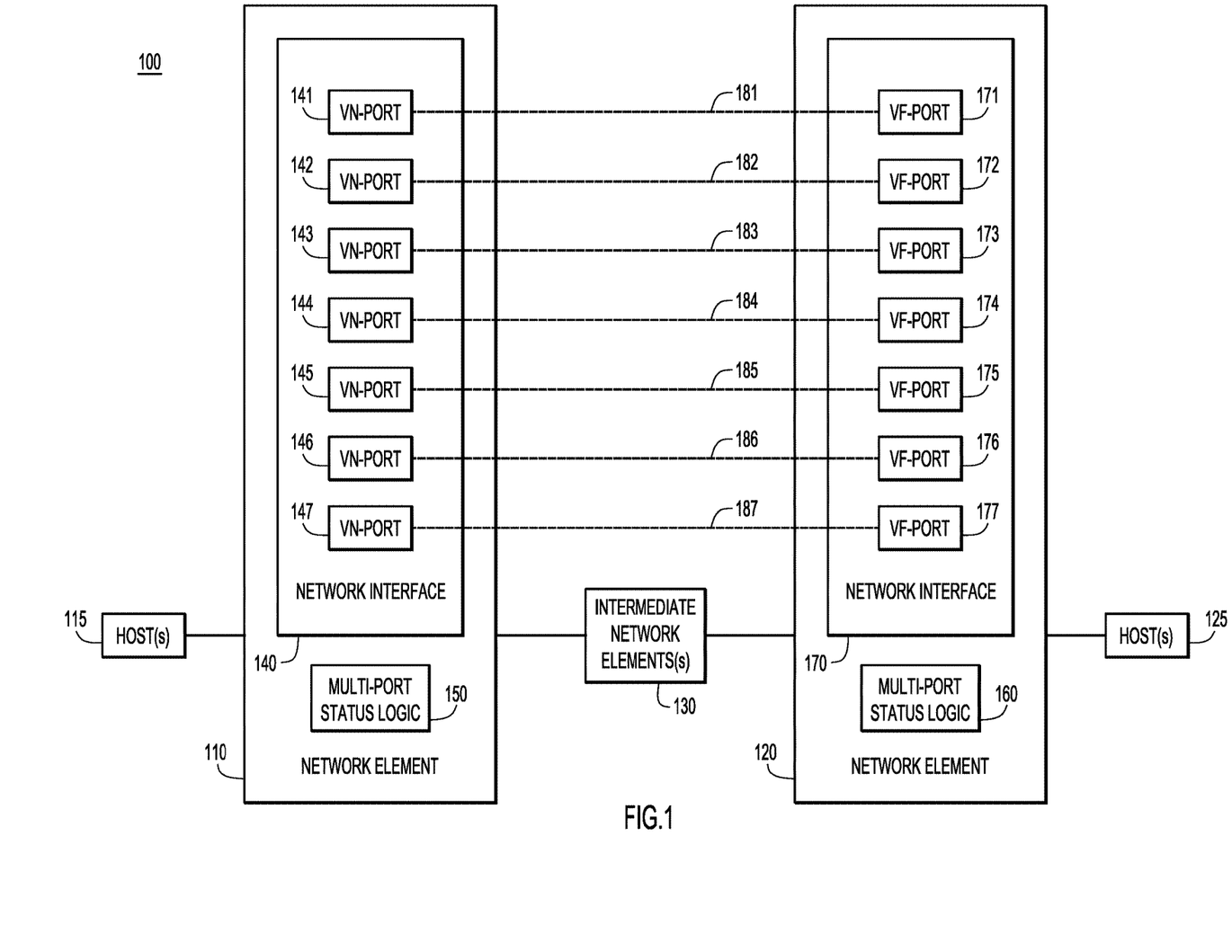
FIG. 1 is a system block diagram illustrating a network system that maintains the link status of multiple network connections, according to an example embodiment.

Referring now to FIG. 1, a simplified block diagram of an FCoE network 100 is shown. The network 100 includes a network element 110 connected to one or more host(s) 115 that communicates with a network element 120 connected to one or more host(s) 125. The network element 110 may communicate with the network element 120 via one or more intermediate network element(s) 130. In one example, the network element 110 may be an ENode and network element 120 may be an FCF device for an FCoE network.

The network element 110 includes a network interface 140 with virtual ports 141, 142, 143, 144, 145, 146, and 147. In one example, the virtual ports 141-147 are VN ports of an ENode in an FCoE network. The network element 110 also includes multi-port status logic 150 that is configured to maintain virtual network connections according to the techniques described herein. The network element 120 includes a multi-port status logic 160 that is configured to maintain virtual network connections with the network element 110. The network element 120 also includes a network interface 170 with virtual ports 171, 172, 173, 174, 175, 176, and 177. In one example, the virtual ports 171-177 are VF ports of an FCF device 120. A plurality of network connections 181, 182, 183, 184, 185, 186, and 187 connect the virtual ports 141, 142, 143, 144, 145, 146, and 147 with the corresponding virtual ports 171, 172, 173, 174, 175, 176, and 177, respectively. In another example, each port/network connection (e.g., network connection 181 between virtual port 141 and the corresponding virtual port 171) is dedicated to carry traffic for a particular VSAN.

In one example, the multi-port status logic 150 coordinates the status messages for each network connection 181-187 into a single multi-port status message from the network element 110 to the network element 120. For instance, in an FCoE network, the multi-port status logic 150 would generate a single FKA message from the ENode 110 to the FCF device 120. The FKA message will have a list of all of the VSANs (i.e., ports 141-147) are "up." When the multi-port status logic 150 generates the FKA message, it will include a listing of the virtual ports that are functioning between the ENode 110 and the FCF device 120. The ENode 110 may also start an FKA timer when the first virtual port (e.g., port 141) is first connected to a corresponding virtual port (e.g., port 171) on the FCF device 120. The FKA timer may expire after a predetermined length of time (e.g., eight seconds).

The FCoE protocol requires that the first FKA message for a particular VSAN be sent eight seconds after the VSAN is "up." With the techniques described herein, the first FKA message for a particular VSAN/network connection will be sent within eight seconds, with subsequent FKA messages sent every eight seconds. The multi-port status logic 160 in the FCF device 120 may receive the multi-port FKA message and update the timer for all of the VSANs from the list of VSANs/ports in the single FKA message.

In another example, the FCoE unicast solicitation protocol exchange may be used to determine if the peer ENode and FCF devices are compatible with the multi-port status messaging protocol described herein. For instance, a new field in the unicast solicitation may be shared between the peers to signal each peer that a multi-port status message will be used for the negotiated network connection. If either peer (e.g., ENode 110 or FCF device 120) does not receive a notification that the other peer supports the multi-port status messaging protocol, then the network connection will default to the standard FKA protocol as defined in the FCoE standard.

In a further example, an ENode 110 that has configured N VSANs will have N VN ports configured for these N VSANs in the ENode 110. When the FKA timer expires for the ENode 110, a single FKA message will be sent to the FCF device 120 as a multi-port status message. This multi-port status message includes a list of VSANs for which the FKA message was sent. In other words, in the time span of a single FKA timer (e.g., eight seconds), only a single FKA message is sent to the FCF device 120 to handle the expiry of multiple VSANs. If there are multiple FCF devices connected to the ENode 110, then only one multi-port status message is sent per VN ports to the FCF devices that have VF ports servicing the VN ports of the ENode 110.

Figure 2:
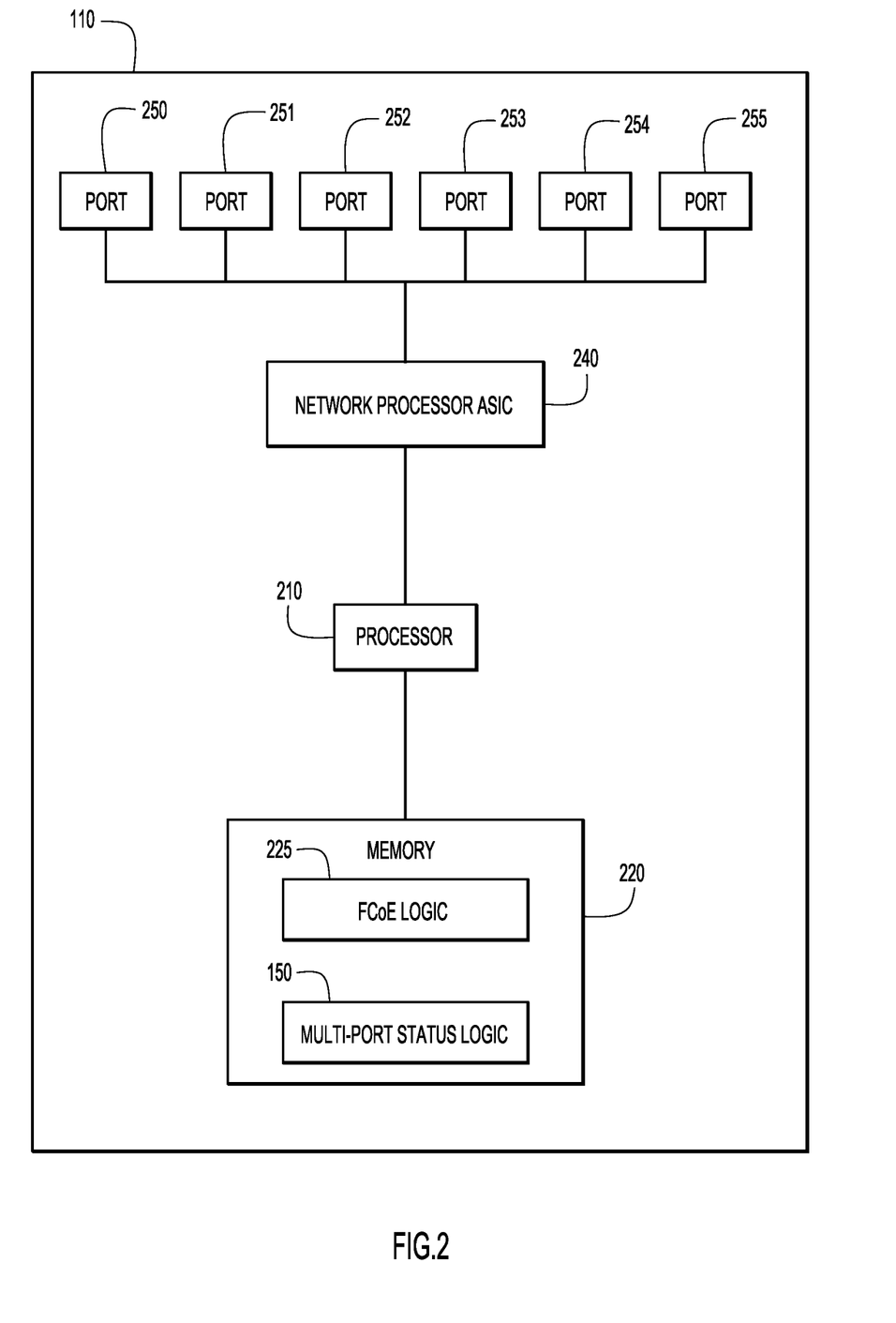
FIG. 2 is a simplified block diagram of a network element that may be configured to perform the methods presented herein, according to an example embodiment.

Referring now to FIG. 2, a simplified block diagram is shown of the network element 110 configured to perform the multi-port status techniques described herein. Network element 120 may also be described with similar elements as shown in FIG. 2. Network element 110 includes, among other possible components, a processor 210 to process instructions relevant to maintaining network connections, and memory 220 to store a variety of data and software instructions (e.g., FCoE logic 225, multi-port status logic 150, communication packets, etc.). The network element 110 also includes a network processor application specific integrated circuit (ASIC) 240 to process communication packets that flow through the network element 110. Network processor ASIC 240 processes communication packets be sent to and received from ports 250, 251, 252, 253, 254, and 255. While only six ports are shown in this example, any number of ports may be included in network element 110. Additionally, the processor 210 may define virtual ports that communicate via one or more of the physical ports 250, 251, 252, 253, 254, and 255.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

It is to be understood that the network element 110 may be a physical device or a virtual (software) device. In the latter case, the network element 110 is embodied as software running on a compute node (e.g., in a datacenter or other environment) through which traffic is directed.

Figure 3:
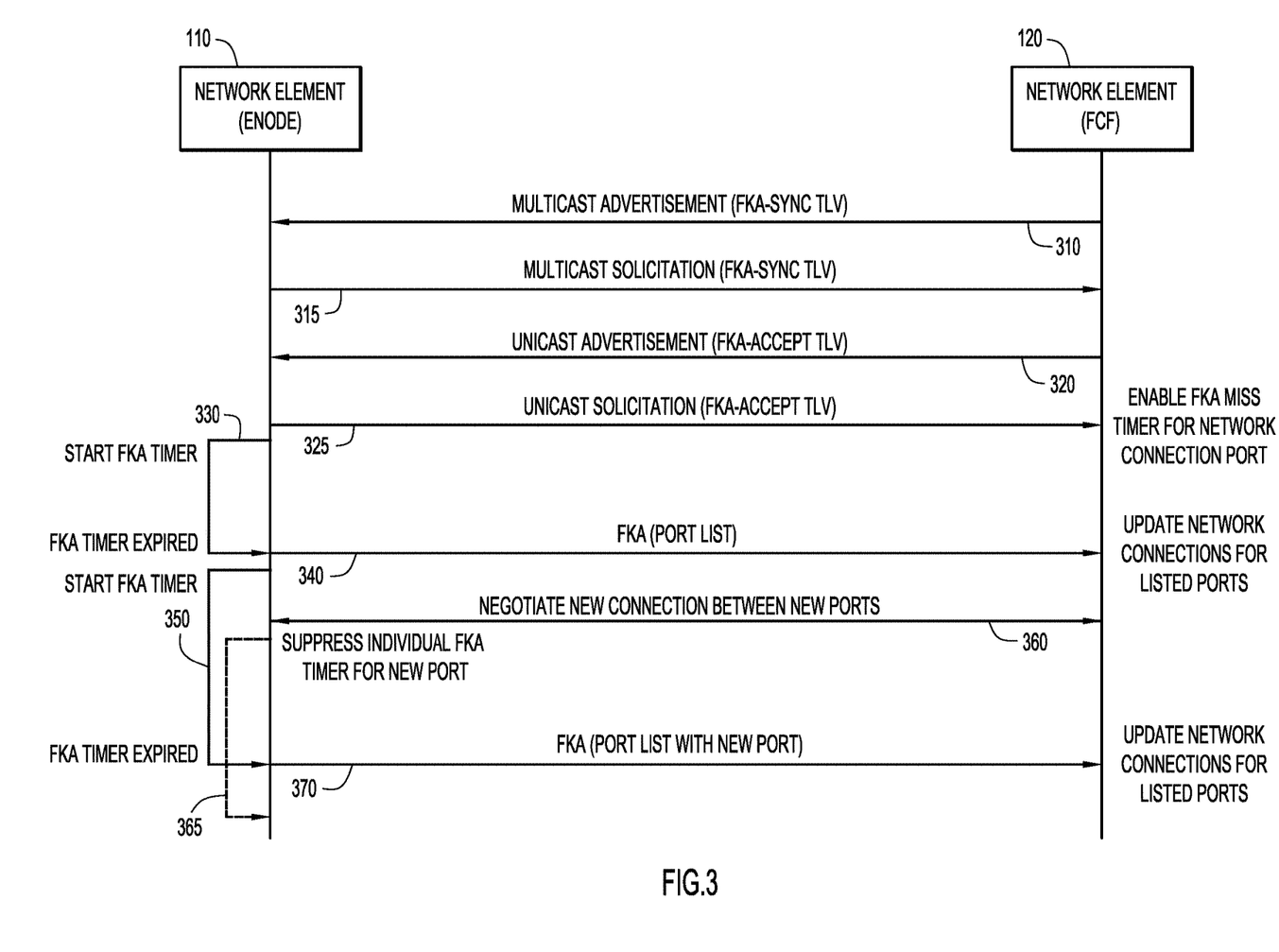
FIG. 3 is a message flow diagram showing messages between network elements to maintain the link status of a plurality of network connections in accordance with a method presented herein.

Referring now to FIG. 3, a message flow diagram shows messages exchanged between two network elements (e.g., ENode 110 and FCF device 120) in setting up and maintaining a network connection. Initially, when a new port on the network element 120 (e.g., a VF port on the FCF device 120) comes up, the network element 120 sends a multicast advertisement 310 to the network elements in the network, including network element 110. The multicast advertisement 310 indicates that the network element 120 supports a multi-port status message, such as a multi-port FKA message. The multicast advertisement 310 may include a Type-Length-Value (TLV) field (e.g., FKA-SYNC) to indicate support for the multi-port status message. Similarly, when a new port on the network element 110 (e.g., a VN port on the ENode 110) comes up, the network element 110 sends a multicast solicitation 315 indicating support for multi-port status messaging. In one example, the multicast solicitation 315 includes a TLV field to indicate that the network element 110 supports multi-port status messages.

To initialize the network connection between the new port on the network element 110 and the corresponding new port on the network element 120, the network element 120 sends a unicast advertisement 320 to the network element 110. In one example, the unicast advertisement 320 includes a TLV field (e.g., FKA-ACCEPT), which indicates that the network connection will use a multi-port status message and confirming the network element 120 accepts the multicast solicitation 315 from the network element 110. Similarly, the network element 110 completes the initialization by responding with a unicast solicitation 325 directed to the network element 120. In one example, the unicast solicitation 325 includes a TLV field (e.g., FKA-ACCEPT), which confirms that the network element 110 will use multi-port status messages for the network connection. When the network element 120 receives the unicast solicitation 325 from the network element 110, the network element 120 enables a keep-alive timer (e.g., FKA Miss timer) for that port (e.g., the VF port). In another example, After configuring the network connection between a first virtual port on the network element 110 and a corresponding second virtual port on the network element 120, the network element 110 starts a network connection status timer 330. The status timer 330 (e.g., an FKA timer for maintaining links according to FIP) in configured to expire after a predetermined interval of time (e.g., eight seconds). When the FKA timer 330 expires, the network element 110 sends a multi-port status message 340 to the network element 120 with a list of the ports with active network connections on the network element 110. In one example, the ENode 110 sends an FKA message 340 with a list of VSANs as a TLV field (e.g., FKA-VSAN-LIST). When the second network element 120 receives the multi-port status message 340 with the list of active ports on the network element 110, the second network element 120 updates the corresponding ports on the network element 120. In one example, the FCF device 120 updates (i.e., adds or removes) VSANs from the FKA-Miss list based on VSANs in the FKA-VSAN-LIST TLV. When the FKA-Miss timer expires (e.g., after 20 seconds to nominally encompass 2.5 FKA timeout periods), the FCF device 120 checks to see which VSANs have not been listed in any FKA received in the FKA Miss Expiry Interval, and marks the missing VSANs as offline.

After sending the FKA messages 340, the network element 110 restarts the FKA timer 350 to enable a periodic keep-alive signal from the network element 110 to the network element 120. A new network connection 360 is negotiated (e.g., through an exchange similar to messages 310, 315, 320, and 325) while the FKA timer 350 is running, the network element 110 may suppress an initial, single-port FKA timer 365 that would typically be started for the individual network connection that was just negotiated. Instead of sending a single-port FKA message after the single-port timer 365 expires, the network element 110 waits until the FKA timer 350 expires, and sends a multi-port FKA message 370, which includes the new port in the listing of ports that are active on the network element 110. The network element 120 will update the network connections for the listed ports, including the newly added port on the network element 110.

Figure 4:
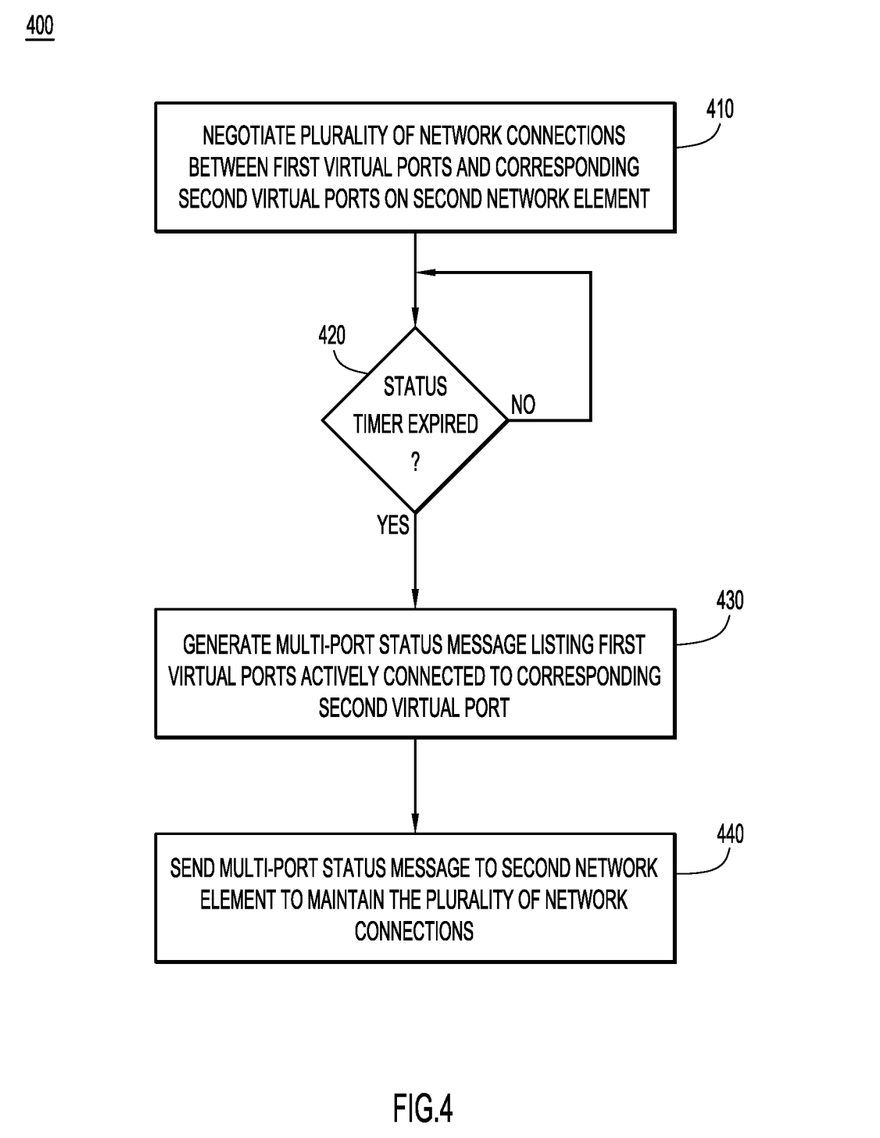
FIG. 4 is a flowchart illustrating operations of a network element in sending a multi-port status message, according to an example embodiment.

Referring now to FIG. 4, a flowchart illustrates operations performed by a first network element (e.g., network element 110) in a process 400 to negotiate and maintain network connections between virtual ports on the first network element and virtual ports on a second network element. At 410, the first network element negotiates a plurality of network connections between a plurality of first virtual ports on the first network element and a corresponding plurality of second virtual ports on the second network element. In one example, the network connections may be negotiated through a set of multicast/unicast advertisement/solicitation messages between the first network element and the second network element. In another example, each network connection, first virtual port, and corresponding second virtual port may be associated with a particular VSAN and carry network traffic for that particular VSAN.

When a status timer expires, as determined at 420, the first network element generates a multi-port status message at 430. The multi-port status message includes a listing of the plurality of first virtual ports that are actively connected to the corresponding plurality of second virtual ports. In one example, the multi-port status message may comprise an FKA message with a custom TLV field listing the VSANs associated with each active virtual port. At 440, the first network element sends the multi-port status message to the second network element to maintain the plurality of network connections.

Figure 5:
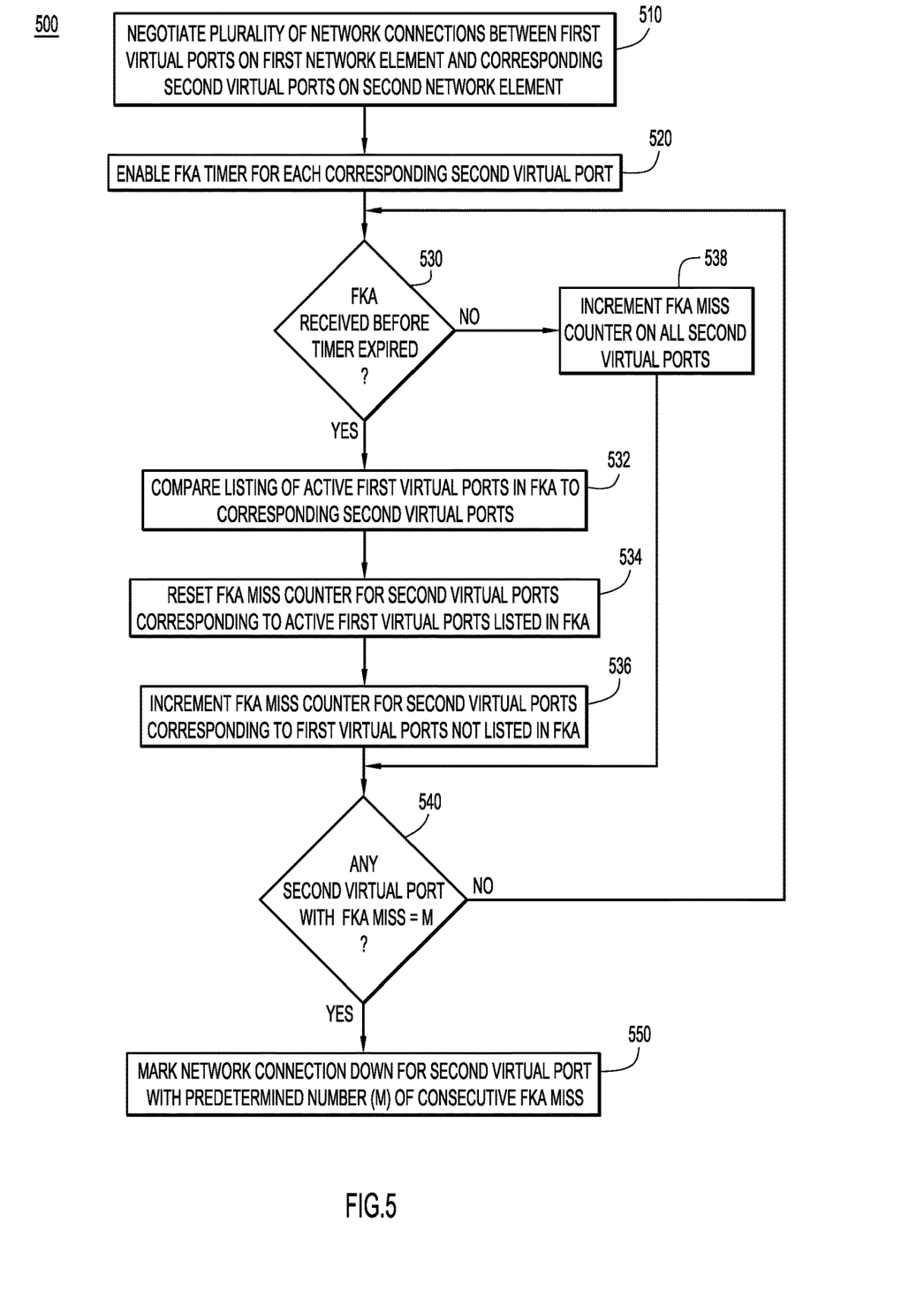
FIG. 5 is a flowchart illustrating operations of a network element processing a multi-port status message, according to an example embodiment.

Referring now to FIG. 5, a flowchart illustrating operations performed by a second network element (e.g., network element 120) in a process 500 to negotiate network connections and maintain the network connections according to the techniques described herein. At 510, the second network element negotiates a plurality of network connections between a plurality of first virtual ports on a first network element and a plurality of corresponding second virtual ports on the second network element. In negotiating the network connections, the first network element and the second network element determine that a multi-port status messaging protocol will be used to determine the operational status of the network connections. In one example, the network connections may be negotiated through a set of multicast/ unicast advertisement/solicitation messages between the first network element and the second network element. In another example, each network connection, first virtual port, and corresponding second virtual port may be associated with a particular VSAN and carry network traffic for that particular VSAN.

At 520, the second network element enables a status timer (e.g., an FKA timer) for each corresponding second virtual port with a network connection to a first virtual port on the first network element. While the status timer is running, the second network element may receive a multi-port status message from the first network element. If the second network element receives a multi-port status messages before the status timer expires, as determined at 530, then the second network element compares the listing of active first virtual ports in the multi-port status message to the corresponding second virtual ports at 532. For any second virtual ports corresponding to active first virtual ports listed in the multi-port status message, the second network element resets a status miss counter (e.g., FKA miss counter) for that second virtual port at 534. For any second virtual ports corresponding to first virtual ports that are not listed in the multi-port status message, the second network element increments the status miss counter for that second virtual port at 536. If the second network does not receive a multi-port status message before the status timer expires, as determined at 530, then the second network element increments the status miss counter for each of the second virtual ports at 538.

For each second virtual port, the second network element determines whether the status miss counter (e.g., FKA miss counter) is equal to or greater than a predetermined threshold (e.g., a number M such as three) at 540. If the status miss counter for a particular second virtual port meets the predetermined threshold, then the second network element marks the corresponding network connection as down at 550. After marking any network connections that have missed the predetermined number of status messages as down, the second network element returns to waiting for another multi-port status message from the first network element.

In summary, the techniques presented herein provide a mechanism that reduces the overhead in efficiently maintaining network connections in an FCoE network. In large scale deployments (i.e., with multiple VSANs configured), the existing FCoE link maintenance protocol is inefficient since each VSAN connection between two network elements requires a separate FKA message. By bundling the FKA messages for each port into a multi-port FKA message the techniques presented herein reduce FCoE processing overhead, which would otherwise result in FCoE network connectivity failures and revenue loss.

In one form, a method is provided for maintaining a plurality of network connections between virtual ports of two network elements. The method includes negotiating the plurality of network connections between a plurality of first virtual ports on a first network element and a corresponding plurality of second virtual ports on a second network element. The method also includes generating a multi-port status message at the first network element. The multiport status message lists the plurality of first virtual ports that are actively connected to the corresponding plurality of second virtual ports. The method further includes sending the multi-port status message from the first network element to the second network element to maintain the plurality of network connections.

The negotiating operation may include: receiving an advertisement message at the first network element, the advertisement message indicating that the second network element supports a multi-port status protocol; and sending a solicitation message from the first network element to the second network element, the solicitation message confirming support for the multi-port status protocol. The method may further include suppressing a single-port status timer after sending the solicitation message.

The method may further include periodically sending the multi-port status message to maintain the plurality of network connections. Furthermore, the method may further include: determining that at least one of the plurality of first virtual ports is inactive; and removing the at least one inactive first virtual ports from the plurality of first virtual ports listed in the multi-port status message.

The method may further include: negotiating an additional network connection between an additional first virtual port on the first network element and a corresponding additional second virtual port on the second network element; and adding the additional first virtual port to the plurality of first virtual ports listed in the multi-port status message.

Further still, the multi-port status message may be formatted as a Fiber Channel over Ethernet (FCoE) Initiation Protocol (FIP) keepalive message with an additional Type-Length-Value field listing the plurality of first virtual ports.

In another form, an apparatus is provided comprising a network interface and a processor. The network interface comprises a plurality of first virtual ports configured to send and receive network communications with computing devices over a computer network. The processor is configured to negotiate a plurality of network connections between the plurality of first virtual ports and a corresponding plurality of second virtual ports on a remote network element. The processor is also configured to generate a multi-port status message listing the plurality of first virtual ports that are actively connected to the corresponding plurality of second virtual ports. The processor is further configured to cause the network interface to send the multi-port status message to the second network element to maintain the plurality of network connections.

In yet another form, a system comprising a first network element and a second network element is provided to maintain a plurality of network connections between the network elements. The first network element includes a plurality of first virtual ports, and is configured to negotiate a plurality of network connections between the plurality of first virtual ports and a corresponding plurality of second virtual ports on the second network element. The first network element is also configured to generate a multi-port status message listing the plurality of first virtual ports that are actively connected to the corresponding plurality of second virtual ports. The first network element is further configured to send the multi-port status message from the first network element to the second network element. The second network element is configured to negotiate the plurality of network connections with the first network element and receive the multi-port status message from the first network element. The second network element is also configured to maintain the plurality of network connections for the corresponding plurality of second virtual ports that correspond to the plurality of first virtual ports listed in the multi-port status message.

In still another form, a non-transitory computer readable storage media is provided that is encoded with instructions that, when executed by a processor, cause the processor to perform any of the methods described and shown herein.

The above description is intended by way of example only. In particular, references to specific network protocols, such as FCoE and FIP, are non-limiting examples of network environments in which the techniques presented herein may be applied. The techniques described herein may also be applied in other network environments using other networking protocols.

What is claimed is:

1. A method comprising:
    negotiating a plurality of network connections between a plurality of first virtual ports on a first network element and a corresponding plurality of second virtual ports on a second network element;
    receiving at the second network element, a single multi-port status message listing the plurality of first virtual ports that are actively connected to the corresponding plurality of second virtual ports; and
    updating a status of the corresponding plurality of second virtual ports to maintain the plurality of network connections.

2. The method of claim 1, wherein updating the status of the corresponding plurality of second virtual ports comprises resetting a plurality of timers associated with the corresponding plurality of second virtual ports.

3. The method of claim 1, wherein negotiating the plurality of network connections comprises:

sending an advertisement message from the second network element to the first network element, the advertisement message indicating that the second network element supports a multi-port status protocol; and receiving a solicitation message from the first network element, the solicitation message confirming support for the multi-port status protocol.

4. The method of claim 1, further comprising periodically receiving the single multi-port status message to maintain the plurality of network connections.

5. The method of claim 1, further comprising:

determining that a previously active second virtual port of the corresponding plurality of second virtual ports does not correspond to any of the first virtual ports listed in the single multi-port status message as being actively connected; and marking the previously active second virtual port as inactive.

6. The method of claim 5, further comprising:

incrementing a counter for the previously active second virtual port; and marking the previously active second virtual port as inactive based on a determination that the counter for the previously active second virtual port exceeds a predetermined threshold.

7. The method of claim 1, wherein the multi-port status message is formatted as a Fiber Channel over Ethernet (FCoE) Initiation Protocol (FIP) keepalive message with an additional Type-Length-Value field listing the plurality of first virtual ports.

8. An apparatus comprising:

a network interface comprising a plurality of virtual ports configured to send and receive network communications with computing devices over a computer network; and a processor configured to:

negotiate a plurality of network connections between the plurality of virtual ports and a corresponding plurality of remote virtual ports on a remote network element;

receive via the network interface, a single multi-port status message listing the corresponding plurality of remote virtual ports that are actively connected to the plurality of virtual ports; and update a status of the plurality of virtual ports to maintain the plurality of network connections.

9. The apparatus of claim 8, wherein the processor is configured to update the status of the plurality of virtual ports by resetting a plurality of timers associated with the plurality of virtual ports.

10. The apparatus of claim 8, wherein the processor is configured to negotiate the plurality of network connections by:

causing the network interface to send an advertisement message from the apparatus to the remote network element, the advertisement message indicating that the apparatus supports a multi-port status protocol; and receiving from the remote network element a solicitation message confirming support for the multi-port status protocol.

11. The apparatus of claim 8, wherein the processor is further configured to periodically receive the single multi-port status message to maintain the plurality of network connections.

12. The apparatus of claim 8, wherein the processor is further configured to:

determine that a previously active virtual port of the plurality of virtual ports does not correspond to any of the remote virtual ports listed in the single multi-port status message as being actively connected; and mark the previously active virtual port as inactive.

13. The apparatus of claim 12, wherein the processor is further configured to:

increment a counter for the previously active virtual port; and mark the previously active virtual port as inactive based on a determination that the counter for the previously active virtual port exceeds a predetermined threshold.

14. One or more non-transitory computer readable storage media encoded with software comprising computer executable instructions and, when the software is executed by a processor on a second network element, operable to cause the processor to:

negotiate a plurality of network connections between a plurality of first virtual ports on a first network element and a corresponding plurality of second virtual ports on the second network element;

receive a single multi-port status message listing the plurality of first virtual ports that are actively connected to the corresponding plurality of second virtual ports; and update a status of the corresponding plurality of second virtual ports to maintain the plurality of network connections.

15. The non-transitory computer readable storage media of claim 14, further comprising instructions operable to cause the processor to update the status of the corresponding plurality of second virtual ports by resetting a plurality of timers associated with the corresponding plurality of second virtual ports.

16. The non-transitory computer readable storage media of claim 14, further comprising instructions operable to cause the processor to negotiate the plurality of network connections by:

sending an advertisement message from the second network element to the first network element, the advertisement message indicating that the second network element supports a multi-port status protocol; and receiving a solicitation message from the first network element, the solicitation message confirming support for the multi-port status protocol.

17. The non-transitory computer readable storage media of claim 14, further comprising instructions operable to cause the processor to periodically receive the single multi-port status message to maintain the plurality of network connections.

18. The non-transitory computer readable storage media of claim 14, further comprising instructions operable to cause the processor to:

determine that a previously active second virtual port of the corresponding plurality of second virtual ports does not correspond to any of the first virtual ports listed in the single multi-port status message as being actively connected; and mark the previously active second virtual port as inactive.

19. The non-transitory computer readable storage media of claim 18, further comprising instructions operable to cause the processor to:

increment a counter for the previously active second virtual port; and mark the previously active second virtual port as inactive based on a determination that the counter for the previously active second virtual port exceeds a predetermined threshold.

20. The non-transitory computer readable storage media of claim 14, wherein the multi-port status message is formatted as a Fiber Channel over Ethernet (FCoE) Initiation Protocol (FIP) keepalive message with an additional Type-Length-Value field listing the plurality of first virtual ports.

\* \* \* \* \*